United States Patent [19]

Roberts et al.

[11] 4,104,134

[45] Aug. 1, 1978

[54] METHOD FOR MAKING AN ALUMINUM OR COPPER SUBSTRATE PANEL FOR SELECTIVE ABSORPTION OF SOLAR ENERGY

[75] Inventors: Marion L. Roberts; Max H. Sharpe; Albert C. Krupnick, all of Huntsville, Ala.

[73] Assignee: The United States of America as represented by the Administrator of the National Aeronautics and Space Administration, Washington, D.C.

[21] Appl. No.: 829,390

[22] Filed: Aug. 31, 1977

[51] Int. Cl.$^2$ .................. C25D 5/50; C25D 5/34; C25D 5/44

[52] U.S. Cl. ................... 204/37 R; 204/32 R; 204/33; 204/38 B

[58] Field of Search ............... 204/32 R, 33, 37 R, 204/38 B

[56] References Cited

U.S. PATENT DOCUMENTS 2,970,090  1/1961  Withers et al. ................... 204/37 R Primary Examiner—John H. Mack
Assistant Examiner—William T. Leader
Attorney, Agent, or Firm—J. H. Beumer; J. R. Manning; L. D. Wofford, Jr.

[57] ABSTRACT

A panel for selectively absorbing solar energy comprising an aluminum substrate, a layer of zinc thereon, a layer of nickel over the zinc layer and an outer layer of solar energy absorbing nickel oxide or a copper substrate with a layer of nickel thereon and a layer of solar energy absorbing nickel oxide distal from the copper substrate. A method for making aforesaid panels is disclosed.

10 Claims, 4 Drawing Figures

METHOD FOR MAKING AN ALUMINUM OR COPPER SUBSTRATE PANEL FOR SELECTIVE ABSORPTION OF SOLAR ENERGY

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to a coated metal substrate which absorbs solar energy selectively and to a method for coating metal substrates to provide a composite which absorbs solar energy selectively.

Metal bodies which selectively absorb solar thermal energy function in this fashion because of a high $\alpha/\epsilon$ ratio, wherein $\alpha$ is absorptance and $\epsilon$ is emittance. Metal bodies having requisite $\alpha/\epsilon$ ratios can be fabricated so that the heat absorbed is transferred to tubes carried in the metal body for subsequent use in heating and cooling operations.

Among coated metals which can be used for fabrication of selective solar thermal energy absorbers is aluminum. Coated aluminum absorbers are particularly valuable for heat exchange units because of the lightness of aluminum, with the resultant decrease in the complexity and weight of structural elements required for support thereof, and because of the ease with which aluminum can be machined and fabricated. See, for example, Lowery, U.S. Pat. No. 3,920,413, incorporated herein by reference.

McCoy, in U.S. Pat. No. 2,473,163, teaches that either bright or dull nickel can be plated on aluminum, following an anodic oxidation step to prepare the surface of the aluminum. However, McCoy does not indicate the sequential application of a bright nickel coating and a black nickel coating to an anodized or zinc coated aluminum base to produce a product having selective thermal absorptivity properties.

Peach, in U.S. Pat. No. 3,531,379, teaches a process for coating an aluminum object wherein a cathodic reduction step follows an anodic oxidation, but does not teach the preparation of a coating which is selective with respect to thermal absorption or emission properties.

Reinert, in U.S. Pat. No. 3,594,288, teaches coating aluminum with an adherent, wearable nickel surface, but does not suggest that the coating obtained exhibits any especially desirable thermal selectivity characteristics.

It has been found that the construction of Lowery, supra, tends to deteriorate with age and use, owing to instability to moisture over long periods of time.

Although black chrome is art recognized as a very stable absorber of solar thermal energy, a deficiency of black chrome is relatively high emissivity of the order of 0.12 and higher.

Although a solar thermal energy absorbing black oxide coating was obtained from thermal oxidation at 800°–900° F. of a bright nickel coating in accordance with Lowery, it was found that the black oxide thus formed tended to delaminate from the aluminum substrate.

Thus, there is a continuing need for the development of solar thermal energy absorbing coatings on aluminum or other substrates which are stable to moisture over prolonged periods of time, which do not delaminate from the substrate under high temperature conditions, which have a low emissivity factor and which are economical and simple to prepare, even on a mass-production scale.

SUMMARY OF THE INVENTION

It has been found, in accordance with the invention, that an aluminum substrate coated with a layer of zinc and then with a layer of nickel, which is oxidized at the surface thereof, is a selective absorber for solar thermal energy.

More particularly, it has been found that a selective absorber for solar energy can be prepared from an aluminum substrate by the steps of:

(a) cleaning the aluminum substrate,
(b) zincating the substrate by immersion in an alkaline solution of zinc ions,
(c) electroplating on the thus-zincated substrate a layer of nickel from a basic nickel sulfamate bath and
(d) oxidizing the thus-produced nickel layer in an oxygen-containing gas.

It has also been found, in accordance with the invention, that a copper substrate coated with a layer of nickel, the surface of which is oxidized to nickel oxide, is a selective absorber of solar energy.

More particularly, it has been found that a selective absorber for solar thermal energy can be prepared from a copper substrate by the steps of:

(a) cleaning the copper substrate,
(b) electroplating on the cleaned copper substrate a layer of nickel from a basic nickel sulfamate bath and
(c) oxidizing the thus-produced nickel layer in an oxygen-containing gas.

Accordingly, it is an object of the present invention to provide a solar panel including a metallic substrate with a solar thermal energy absorbing coating of selective oxides of nickel thereon.

It is also an object of this invention to provide a method for preparing a metallic substrate to receive a layer of nickel thereon and to oxidize the thus-produced layer of nickel to nickel oxide, which selectively absorbs solar energy.

More particularly, it is an object of the invention to provide a method for converting an aluminum or copper substrate to a workpiece which selectively absorbs solar energy and does not re-emit the absorbed energy.

DESCRIPTION OF THE PREFERRED EMBODIMENT

Figure 1:
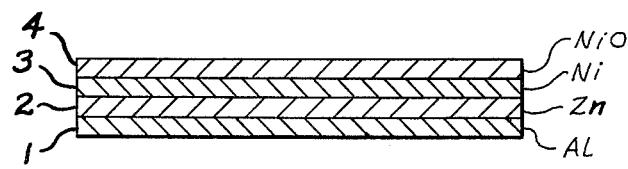
FIG. 1 is a sectional view (not to scale) of an aluminum solar energy absorbing workpiece in accordance with the invention.

With respect to solar energy absorbing panels or workpieces made from either a zincated aluminum substrate or a copper substrate, those are most preferred wherein solar absorptance ($\alpha$) is at least 0.91 and solar emittance ($\epsilon$) is less than about 0.07.

Of the methods of making a solar energy absorbing panel from aluminum, that which is most preferred is that wherein the substrate is cleaned by the steps of:

(a) degreasing with a vapor degreasing solvent,
(b) soaking at 140°–180° F. for 5–10 minutes in an aqueous solution of an alkaline cleaner,
(c) immersion in an agitated bright dip solution at 180°–200° F. for 5–10 minutes,
(d) soaking at 140°–180° F. for 30 seconds in an aqueous solution of an alkaline cleaner, and
(e) desmutting with aqueous acid at room temperature. and wherein the layer of nickel is electroplated from a basic nickel sulfamate bath at 110°–140° F. at a current density of 20 amperes/ft.$^2$ for 25–45 minutes, the thus-produced layer of nickel is 0.0004 –0.0008 inch in thickness and is oxidized in air at 900°–950° F. for 3–5 minutes.

Among the methods for making a solar energy absorbing panel from copper, the most preferred is that wherein the copper substrate is cleaned by the steps of:

(a) degreasing with a vapor degreasing solvent,
(b) soaking at 140°–180° F. for 5–10 minutes in an aqueous solution of an alkaline cleaner, and
(c) pickling at 140°–180° F. for 5–15 seconds in a copper cyanide bath, and nickel is electroplated and oxidized as above.

"Metallic substrate," as used in the specification and claims, means aluminum and copper, both of which have good heat exchange properties and which can be fabricated into structures which can carry tubes or other means for subsequent heat exchange in a heating or cooling operation. Other metal substrates which are platable with nickel and which are stable at the temperatures required for oxidation of the nickel can also be used.

It will be appreciated that "aluminum," as used in the specification and claims, means essentially pure aluminum such as alloy type AA 1100, which contains about 1.0% of iron and silicon, 0.20% of copper, 0.05% of manganese, and 0.10% of zinc. Also included within the definition of aluminum are Al-Mn alloys, such as AA 3003; Al-Mg alloys, e.g., AA 5005; Al-Mg-Si alloys, for example, AA 6061; Al-Cu-Mg alloys, e.g. AA 2014 and 2024; and Al-Mg-Zn alloys such as AA 7075. The compositional details of the foregoing types of aluminum alloys can be found in Kirk-Othmer, "Encyclopedia of Chemical Technology," II, Volume 1, Interscience Publishers, New York (1963), at 975. Aluminum alloys especially preferred for the practice of this invention include the Al-Cu-Mg alloys, e.g. AA 3003, and 5005; and essentially pure aluminum, as exemplified by AA 1100.

"Copper," as used in the specification and claims, includes relatively pure copper and copper alloys.

Copper alloys which can be used in the practice of this invention include both single-phase and polyphase alloys. See, Kirk-Othmer, "Encyclopedia of Chemical Tehnology," II Volume 6, at 256–265 (1965). Included within this group of alloys are brass, which are essentially alloys of Cu and Zn; bronzes, which contain tin and a small amount of phosphorus; nickel silvers, which are Cu-Zn-Ni alloys; and cupronickels, which are Cu-Ni alloys which can contain minor amounts of Mn, Fe and Zn. Of the foregoing, cupronickels are preferred as substrates for heat exchanger elements fabricated in accordance with the invention.

Unalloyed copper, i.e., copper containing less than about 0.5% by weight of impurities or alloying elements is also preferred for the practice of this invention.

Metallic substrates used in the practice of the invention are generally 10–125 mils in thickness. Preferably, sheets 20–60 mils thick are selected. Good heat transfer characteristics are obtained using oxide-coated sheets 20 mils thick. As the thickness of the sheet or other substrate increases, thermal conductivity becomes less efficient owing to an inertia effect. It will be understood that the substrates may be fabricated in any shape, including tubing of any selected diameter. In such a case, the thickness of the tube wall may need to be increased to avoid "hot spots" where solar energy is applied on one side.

"A layer of zinc" on the aluminum substrate means a thin film or layer of zinc, of the order of 0.00015–0.0002 inch thickness, such as is obtained using a zincating bath, e.g. Zn-77 with catalyst sold by the Diversey Corp. of Chicago, Ill. Typical conditions for the zincating of aluminum consists of immersing the clean aluminum surface into a bath containing about 13 ounces per gallon of zinc oxide and about 70 ounces per gallon of sodium hydroxide for 30 seconds to one minute at a bath temperature of around 70°–90° F.

"A layer of nickel" on a zincated aluminum or on a copper substrate means a thin film or layer of 0.0004–0.0008 inch in thickness, as deposited by electroplating from a basic nickel sulfamate bath at a temperature of 110°–140° F. and a current density of 20 amperes/ft.$^2$ for 25–45 minutes. Other heat-treatable nickel coatings such as the 700 series Niklad electroless nickel plating by Allied Kelite can also be employed.

Preferably, the electroplating is done at 120° F. at a current density of 20 amperes/ft.$^2$ for 30 minutes.

Typically, a sulfamate nickel bath contains nickel metal at a concentration of 72–80 grams/liter, and boric acid at a concentration of 37–45 grams/liter.

The thus-produced nickel coating is oxidized in an oxygen-containing gas, conveniently air, at a temperature of 800° to 1050° F. for 2 to 7 minutes, and preferably at 900 to 950° F. for 3 to 5 minutes. The required heating time depends upon the thickness of the substrate, a longer heating time being required for thicker substrates. The resulting exterior layer of nickel oxide is extremely thin, which characteristic is critical to attainment of a low emittance value, along with high absorptance. Although accurate measurement is difficult because of surface roughness on the microscopic level, thickness of the oxide layer is believed to be in the range of 400 to 1000 Angstroms. Formation of the oxide layer can be observed visually, the outer surface turning dark blue in color when the reaction is complete.

The solar panels, in accordance with this invention, have absorptance greater than about 0.89, preferably as high as 0.93 or greater and emittance less than about 0.10, preferably as low as 0.04.

It will be understood that the significance of the $\alpha/\epsilon$ ratio, where $\alpha$ is solar absorptance and $\epsilon$ is emittance, is that a high $\alpha/\epsilon$ ratio indicates a high efficiency in terms of collecting solar thermal radiation. When conventional black nickel coatings are prepared on aluminum, such coatings are dark black, relatively thick, and have a high solar absorptance as well as high emittance, so that the ratio approaches unity or less. Thus, it is imperative that the nickel oxide solar absorber layer be very thin.

In the foregoing cases, when $\alpha$ is 0.93 and $\epsilon$ is 0.04, as measured, for example, by Gier-Dunkle instruments, the $\alpha/\epsilon$ ratio is 0.93/0.04 or 23.25.

Among instruments typically used to determine $\alpha$ and $\epsilon$ are the Model DB-100 infrared reflectometer and the Model MS-250 solar reflectometer by Gier-Dunkle Instruments of Santa Monica, Calif. In the above case, a measured solar reflectance of 0.07 gives the absorptance of 0.93, whereas the measured infrared reflectance is 0.96 and emittance 0.04.

Aluminum substrates used for solar energy absorbing workpieces are cleaned prior to the zincating step. A preferred sequence of steps for the cleaning operation includes immersion of the workpiece in a bright dip solution, specifically the steps of:

(a) degreasing with a vapor degreasing solvent,
(b) soaking at 135°-145° F. for 5-10 minutes in an aqueous solution of an alkaline cleaner,
(c) immersion in an agitated bright dip solution at 180°-200° F. for 5-10 minutes,
(d) soaking at 140°-180° F. for 30 seconds in an aqueous solution of mild alkaline cleaner, and
(e) desmutting with aqueous acid at room temperature.

Degreasing is preferably carried out by use of perchloroethylene vapor degreasing solvent at a temperature of 250° F.

The degreased workpiece is soaked in a mild alkaline cleaner, e.g., Embond S-64 (Enthone, Inc., New Haven, Conn.) or Altrex (Wyandotte Corp., Wyandotte, Mich). Although the compositions of these materials are proprietary, they are thought to contain alkaline salts, e.g. NaOH silicates or carbonates. This step is generally done at 140°-180° F. for 5-10 minutes at a concentration of 8 oz./gal.

"Immersion in a bright dip solution" means application of a solution which selectively etches the aluminum surface to cause a leveling effect of the surface and, therefore, increase specularity which in turn lowers infrared emissivity.

A preferred technique for the practice of the present invention is a non-electrolytic technique using a bath which typically consists of 80% of phosphoric acid, 2-2.5% of nitric acid, 1-2% of sulfuric acid and 100 p.p.m. (parts per million) of copper sulfate and 20-40 grams/liter of aluminum, particularly, as aluminum phosphate. Generally, this step is done at 170°-220° F. preferably 180°-200° F.

"Desmutting" means contacting the metal workpiece with an acid to remove smut formed by reaction of aluminum with an alkaline reagent in a preceding step. This is conveniently done using 45-55% nitric acid at room temperature.

An alternative technique for cleaning and preparing an aluminum workpiece having a good surface finish consists of the following steps:

(a) degreasing with a vapor degreasing solvent,
(b) soaking at 135°-145° F., for 5-10 minutes in an aqueous solution of an alkaline cleaner,
(c) etching with sodium hydroxide solution at 180°-200° F.
(d) desmutting with aqueous acid solution at room temperature, and
(d) immersion in sodium hydroxide solution at 180°-200° F. for 10 seconds and then checking for uniform smut.

The concentration of sodium hydroxide is preferably 12 ounces/gallon, but can range from 10-15 ounces/gallon. These steps are generally carried out at 190° F.

"Basic nickel sulfamate" solution means a solution of nickel sulfamate, sulfamic acid, boric acid and proprietary anti-pitting agents (SNAP). Typical of the commercially available baths is Barrett Sulfamate nickel concentrate "SNR" made by Allied-Kellite Corp. which is thought to consist of sulfamic acid and nickel sulfamate.

The electroplating operation is done at a temperature of 130°-150° F. and a current density of 20-25 amperes/ft.$^2$ for 20-25 minutes, preferably 20 amperes/ft.$^2$ at 140° F. for 20-40 minutes.

It will be understood that in the cleaning and subsequent treatment of the copper or aluminum workpieces, washes with deionized water, either by spraying therewith or immersion therein, are customary and preferred between each of the steps specifically set forth above.

In FIG. 1 is represented the structure of an aluminum workpiece prepared in accordance with the invention. The aluminum substrate 1 is coated by a layer of Zinc 2, over which is coated a layer of nickel 3, the surface of which is solar thermal energy absorbing nickel oxide 4.

Figure 2:
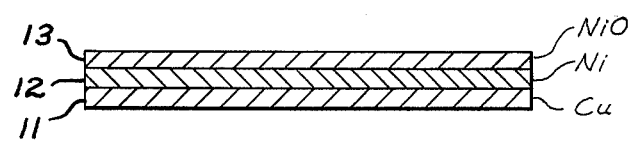
FIG. 2 is a sectional view (not to scale) of a copper solar energy absorbing workpiece in accordance with the invention.
Figure 3:
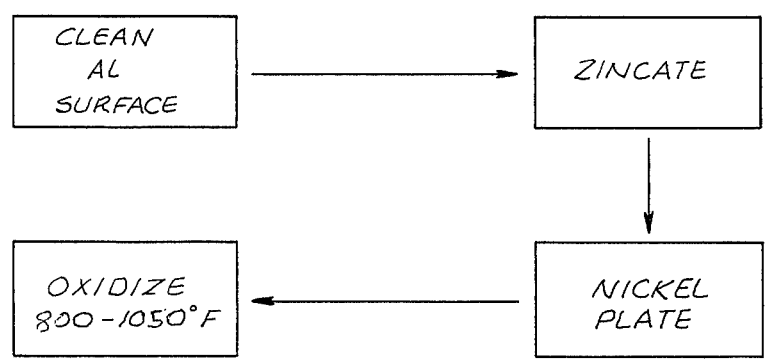
FIG. 3 represents a process for making an aluminum workpiece coated with a solar energy layer of nickel oxide.
Figure 4:
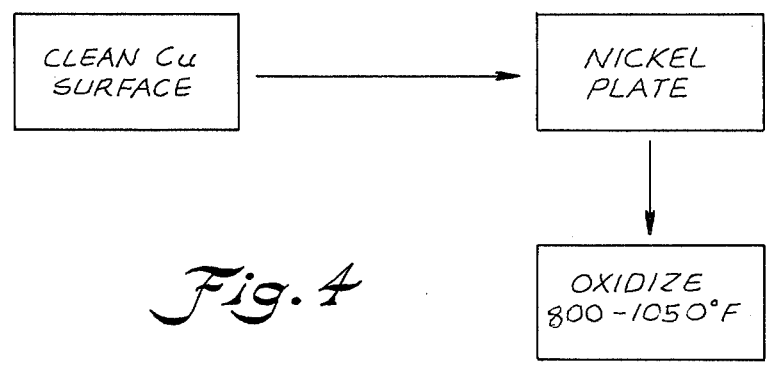
FIG. 4 represents a process for making a copper workpiece coated with a solar energy absorbing layer of nickel oxide.

In a copper workpiece prepared in accordance with this invention and represented by FIG. 2, a copper substrate 11 is coated with a layer of nickel 12, the surface of which is in the form of highly adherent nickel oxide 13.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following examples, the temperatures are set forth uncorrected in degrees Fahrenheit; unless otherwise indicated, all parts and percentages are by weight.

EXAMPLE 1

Substrates of aluminum (1100 or 3003 Series alloys) in the form of 0.042 inch thick sheet material are converted to selective absorbers for solar thermal energy by the following steps:

(1) hand clean thoroughly at room temperature by wiping with a non-abrasive cloth moistened with acetone,
(2) degrease at 250° F. by immersion until vapor ceases to condense in a stainless steel tank in perchloroethylene,
(3) rinse with deionized water at room temperature,
(4) soak at 140° F. for 5-10 minutes in an alkaline bath (Altrex) containing 8 oz./gal. of alkaline cleaner,
(5) rinse with deionized water at room temperature,
(6) desmut with 50% nitric acid solution in a stainless steel tank at room temperature (optional step),
(7) rinse at room temperature with deionized water,
(8) immerse in an agitated bright dip solution of: 80% phosphoric acid 2-2.5% nitric acid 100 p.p.m. copper sulfate 20-40 g./liter of Al+++ (as aluminum phosphate) 1-2% sulfuric acid balance deionized water in a stainless steel tank at 180°–200° F. for 5–10 minutes,
(9) rinse with deionized water in a stainless steel tank at room temperature for 5 minutes using a hydrospray at room temperature.
(10) immerse in a stirred alkaline solution as in (4) above, at 140°–180° F. for 30 seconds,
(11) rinse in deionized water, with agitation, at room temperature for 30 seconds,
(12) desmut with 50% nitric acid in a stainless steel tank for 30 seconds at room temperature,
(13) rinse with deionized water at room temperature in a stainless steel tank,
(14) zincate with zincating solution (Zn-77) at a level of 4–4.5 pounds/gallon in a stainless steel tank at 70°–90° F. for 30 seconds,
(15) rinse in clean deionized water,
(16) treat with 50% nitric acid and deionized water in a stainless steel tank at room temperature for 30 seconds,
(17) rinse with deionized water in a stainless steel tank at room temperature for 5 minutes,
(18) zincate, as in (14),
(19) rinse with deionized water, as in (17),
(20) nickel plate immediately with sulfamate nickel bath of the following composition:

Nickel content    72–85 grams/liter
Boric acid    37–45 grams/liter
Sulfamate Anti-Pit (SNAP)    0.65–0.75 grams/liter
Specific gravity    1.26–1.30

The plating solution is in an agitated polypropylene lined tank with electrolyte nickel anode chips being utilized. The plating is done at 20–25 amperes/ft.$^2$ for 30 minutes at 120° F.
(21) rinse with deionized water at room temperature as in (9),
(22) dry at room temperature with air which is free of moisture, oils and particulates,
(23) oxidize in air at 950° F. for 4–5 minutes.

The thus-produced coating is deep blue in color and is believed to be about 1000 Å in thickness, as determined by scanning electron microscope (SEM) and stylus profilometer.

The absorptivity of the specimens is 0.85–0.92 and the emissivity is 0.04 to 0.08.

EXAMPLE 2

Workpieces of 1100 or 3003 Series aluminum with a good surface finish, i.e., a No. 6 mil finish with an emissivity of 0.03 or less were processed as in Example 1, except for steps (8) – (11) which were replaced by:
(A) etch with NaOH at 12 ounces/gallon at 190° F. for 1 minute in a steel-lined tank,
(B) rinse with deionized water in a steel-lined tank at room temperature for 1 minute,
(C) desmut with 50% nitric acid in a stainless steel-lined tank at room temperature for 1 minute,
(D) rinse with deionized water in a stainless steel tank at room temperature for 1 minute,
(E) check with NaOH (12 ounces/gallon) in a steel tank at 190° for 10 seconds. If the smut is not uniform, repeat steps (A) – (F),
(F) rinse with deionized water in a stainless steel-lined tank at room temperature for 1 minute.

The thus-obtained coatings are deep blue in color and are believed to be about 1000 Å in thickness. The absorptivity of the specimens is 0.85–0.92 and the emissivity is 0.04 to 0.08.

EXAMPLE 3

Substrates of copper in the form of 0.042 inch thick sheet material are converted to selective absorbers for solar energy by the following steps:
(1) hand clean thoroughly at room temperature by wiping with a non-abrasive cloth moistened with acetone,
(2) degrease at 250° F. by immersion in a stainless steel tank, in perchloroethylene,
(3) rinse with deionized water at room temperature,
(4) soak at 140° F. for 5–10 minutes in an alkaline bath (Altrex) containing 8 ounces/gallon of alkaline cleaner,
(5) rinse with deionized water at room temperature,
(6) pickle by immersion in aqueous CuCN at 160° F. for about 10 seconds,
(7) rinse by immersion in deionized water at room temperature,
(8) electroplate with nickel sulfamate bath against a nickel anode as in Example 1, step (20),
(9) rinse with deionized water in a stainless steel tank at room temperature for 5 minutes using a hydrospray at room temperature,
(10) dry at room temperature with air free of moisture, oils and particulates,
(11) oxidize in air at 950° F. for 4–5 minutes.

The thus-produced coatings are deep blue in color and are believed to be about 1000 Å in thickness.

The absorptivity of the specimens is 0.84 to 0.92 and the emissivity is 0.04 to 0.08.

The preceding examples can be repeated with similar success by substituting the generically or specifically described reactants and/or operationg conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for making a panel for selectively absorbing solar thermal radiation, comprising the steps of:
    (a) cleaning the aluminum substrate;
    (b) zincating the substrate by immersion in an alkaline solution of zinc ions;
    (c) electroplating on the thus-zincated substrate a layer of nickel from a basic nickel sulfamate bath;
    (d) oxidizing the thus-produced nickel layer in an oxygen-containing gas at 800°–1050° F. for 2–7 minutes.

2. The method of claim 1, wherein the aluminum substrate is cleaned by the steps of:
    (a) degreasing with a vapor degreasing solvent,
    (b) soaking at 140°–180° F. for 5–10 minutes in an aqueous solution of an alkaline cleaner,
    (c) immersion in an agitated bright dip solution at 190°–200° F. for 5–10 minutes,
    (d) soaking at 140°–180° F. for 30 seconds in an aqueous solution of an alkaline cleaner, and
    (e) desmutting with aqueous nitric acid at room temperature.

3. The method of claim 1, wherein the substrate is cleaned by the steps of:
    (a) degreasing with a vapor degreasing solvent,
    (b) soaking at 140°–180° F., for 5–10 minutes in an aqueous solution of an alkaline cleaner, (c) etching with sodium hydroxide solution at 180°–200° F.,
(d) desmutting with aqueous nitric acid solution at room temperature, and
(e) immersion in sodium hydroxide solution at 180°–200° F. for 10 seconds and then checking for uniformity of smut.

4. The method of claim 1, wherein the layer of nickel is electroplated from a basic nickel sulfamate bath at 120°–140° F. at a current density of 20 amperes/ft.$^2$ for 25–35 minutes, the thus-produced layer of nickel is 0.3–0.5 mils in thickness and is oxidized in air at 900°–950° F. for 3–5 minutes.

5. The method of claim 1, wherein the substrate is cleaned by the steps of:
(a) degreasing with a vapor degreasing solvent,
(b) soaking at 140°–180° F. for 5–10 minutes in an aqueous solution of an alkaline cleaner,
(c) immersion in an agitated bright dip solution at 190°–200° F. for 5–10 minutes,
(d) soaking at 140°–180° F. for 30 seconds in an aqueous solution of an alkaline cleaner, and
(e) desmutting with aqueous acid at room temperature.

6. The method of claim 5, wherein the layer of nickel is electroplated from a basic nickel sulfamate bath at 120°–140° F. at a current density of 20 amperes/ft.$^2$ for 25–35 minutes, the thus-produced layer of nickel is 0.3–0.5 mils in thickness and is oxidized in air at 900°–950° F. for 3–5 minutes.

7. A method for making a panel for selectively absorbing solar thermal radiation, comprising the steps of:
(a) cleaning the copper substrate,
(b) electroplating on the copper substrate a layer of nickel from a basic nickel sulfamate bath;
(c) oxidizing the thus-produced nickel layer in an oxygen-containing gas at 800°–1050° F. for 2–7 minutes.

8. The method of claim 7, wherein the copper substrate is cleaned by the steps of:
(a) degreasing with a vapor degreasing solvent,
(b) soaking at 140°–180° F. for 5–10 minutes in an aqueous solution of an alkaline cleaner, and
(c) pickling at 140°–180° F. for 5–15 seconds in an alkaline cyanide bath.

9. The method of claim 7 wherein the layer of nickel is electroplated from a basic nickel sulfamate bath at 120°–140° F. at a current density of 20 amperes/ft.$^2$ for 25–35 minutes, the thus-produced layer of nickel is 0.3–0.5 mils in thickness and is oxidized in air at 900°–950° F. for 3–5 minutes.

10. The method of claim 7, wherein the copper substrate is cleaned by the steps of:
(a) degreasing with a vapor degreasing solvent,
(b) soaking at 140°–180° F. for 5–10 minutes in an aqueous solution of an alkaline cleaner, and
(c) pickling at 140°–180° F. for 5–15 seconds in an alkaline cyanide bath,
and wherein the layer of nickel is electroplated from a basic nickel sulfamate bath at 120°–140° F. at a current density of 20 amperes/ft.$^2$ for 25–35 minutes, the thus-produced layer of nickel is 0.3–0.5 mils in thickness and is oxidized in air at 900°–950° F. for 3–5 minutes.

* * * * *